US012375607B2

(12) United States Patent
Kelleher et al.

(10) Patent No.: US 12,375,607 B2
(45) Date of Patent: Jul. 29, 2025

(54) SYSTEMS AND METHODS FOR INTELLIGENT CALLER TO AGENT ASSIGNMENT

(71) Applicant: Allstate Insurance Company, Northbrook, IL (US)

(72) Inventors: Gregory Kelleher, Northbrook, IL (US); Vinod Shurpali, Northbrook, IL (US); Stacey Smith, Northbrook, IL (US); Julie-Ann Macklem, Northbrook, IL (US); Erik Fretland, Northbrook, IL (US); Patrick Cizek, Northbrook, IL (US); Meg Kaestner, Northbrook, IL (US); Allison Gonzales, Northbrook, IL (US); Andrew Tiano, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 224 days.

(21) Appl. No.: 18/340,439

(22) Filed: Jun. 23, 2023

(65) Prior Publication Data
US 2024/0430362 A1    Dec. 26, 2024

(51) Int. Cl.
*H04M 3/00* (2024.01)
*H04M 3/523* (2006.01)

(52) U.S. Cl.
CPC ................. *H04M 3/5232* (2013.01)

(58) Field of Classification Search
CPC .................................................. H04M 3/5232
USPC ......... 379/265.01–265.14, 266.1–266.1, 309
See application file for complete search history.

(56) References Cited

U.S. PATENT DOCUMENTS

| | | | |
|---|---|---|---|
| 9,008,284 B2 | 4/2015 | Morganstein et al. | |
| 10,560,579 B1 | 2/2020 | Wu et al. | |
| 10,887,464 B2 | 1/2021 | Ghuge et al. | |
| RE48,476 E * | 3/2021 | Chishti | H04M 3/5232 |

(Continued)

FOREIGN PATENT DOCUMENTS

WO    2016/019194    4/2016

OTHER PUBLICATIONS

Negin Mehrbod et al.; "Profile-based Matching of Clients and Agents in Remote Customer Support"; Proceedings of the 5th NA International Conference on Industrial Engineering and Operations Management; Aug. 10-14, 2020; pp. 1131-1142.

*Primary Examiner* — William J Deane, Jr.
(74) *Attorney, Agent, or Firm* — Dinsmore & Shohl LLP (57) ABSTRACT

Systems and methods for intelligent caller to agent assignment receive requests to establish a voice call session for a plurality of callers, identify demographic information, score a caller-agent combination to generate a plurality of scores, determine the caller-agent combination with a highest score of the plurality of scores, and assign a first agent of the caller-agent combination with the highest score to the voice call session for a caller, and when a first agent is concurrently assigned to another voice call session for another caller, execute one or more iterations until (i) the first agent is assigned to one of the voice call session for the caller and the another voice call session for the another caller and (ii) a second agent of another caller-agent combination is assigned to the other of the voice call session for the caller and the another voice call session for the another caller.

20 Claims, 6 Drawing Sheets

(56) References Cited

U.S. PATENT DOCUMENTS

| | | | |
|---|---|---|---|
| 2009/0122972 A1* | 5/2009 | Kaufman | H04M 3/5237 |
| | | | 379/265.12 |
| 2010/0111285 A1* | 5/2010 | Chishti | H04M 3/5232 |
| | | | 706/18 |
| 2010/0142698 A1* | 6/2010 | Spottiswoode | H04M 3/5232 |
| | | | 379/265.11 |
| 2014/0086403 A1* | 3/2014 | Chishti | H04M 3/5191 |
| | | | 379/265.11 |
| 2017/0013131 A1 | 1/2017 | Craib | |
| 2017/0316438 A1* | 11/2017 | Konig | G06Q 30/01 |
| 2020/0329154 A1 | 10/2020 | Baumann et al. | |
| 2022/0239777 A1 | 7/2022 | Tennur Narayanan et al. | |
| 2023/0008822 A1* | 1/2023 | Serban | H04M 3/493 |

* cited by examiner

SYSTEMS AND METHODS FOR INTELLIGENT CALLER TO AGENT ASSIGNMENT

TECHNICAL FIELD

The present disclosure relates to intelligent caller to agent assignment and, in particular, an intelligent caller to agent assignment to provide assignment of a caller-agent combination with a highest score and to execute multiple iterations of an optimization algorithm when an assigned agent is concurrently assigned to another voice call session.

BACKGROUND

Call centers may receive a high volume of calls that are routed to available agents. A need exists for alternative routing solution operating more effectively, efficiently, and in a streamlined manner to assign callers to agents.

BRIEF SUMMARY

According to subject matter of the present disclosure, a computer implemented system for intelligent caller to agent assignment may include at least one processor and a memory unit communicatively coupled to the at least one processor, wherein the memory unit stores computer-readable instructions that, when executed by the at least one processor, cause the computer implemented system to receive, from one or more client devices, a number of requests to establish a voice call session for a plurality of callers, identify demographic information corresponding to each caller associated with the one or more client devices, and score, using an optimization algorithm of a machine learning model and based on the demographic information corresponding to each caller and performance data for each of a plurality of agents, a caller-agent combination for each of the plurality of agents and each caller associated with the one or more client devices to generate a plurality of scores. The computer implemented system may be further caused to determine, based on the plurality of scores, the caller-agent combination with a highest score of the plurality of scores, assign a first agent of the caller-agent combination with the highest score to the voice call session for a caller of the plurality of callers, and, when the first agent is concurrently assigned to another voice call session for another caller of the plurality of callers, execute one or more iterations of the optimization algorithm of the machine learning model until (i) the first agent is assigned to one of the voice call session for the caller and the another voice call session for the another caller and (ii) a second agent of another caller-agent combination is assigned to the other of the voice call session for the caller and the another voice call session for the another caller.

According to another embodiment of the present disclosure, a method for intelligent caller to agent assignment may include receiving, from one or more client devices, a number of requests to establish a voice call session for a plurality of callers, identifying demographic information corresponding to each caller associated with the one or more client devices, and scoring, using an optimization algorithm of a machine learning model and based on the demographic information corresponding to each caller and performance data for each of a plurality of agents, a caller-agent combination for each of the plurality of agents and each caller associated with the one or more client devices to generate a plurality of scores. The method may further include determining, based on the plurality of scores, the caller-agent combination with a highest score of the plurality of scores, assigning a first agent of the caller-agent combination with the highest score to the voice call session for a caller of the plurality of callers, and when the first agent is concurrently assigned to another voice call session for another caller of the plurality of callers, executing one or more iterations of the optimization algorithm of the machine learning model until (i) the first agent is assigned to one of the voice call session for the caller and the another voice call session for the another caller and (ii) a second agent of another caller-agent combination is assigned to the other of the voice call session for the caller and the another voice call session for the another caller.

According to yet another embodiment of the present disclosure, a method for intelligent caller to agent assignment may include receiving, from one or more client devices, a number of requests to establish a voice call session for a plurality of callers, identifying demographic information corresponding to each caller associated with the one or more client devices, wherein the demographic information corresponding to each caller comprises one or more factors of a caller profile for each caller stored in a caller profile directory, accessing performance data for each of a plurality of agents, training a machine learning model based on the performance data, and scoring, using an optimization algorithm of the machine learning model and based on the demographic information corresponding to each caller and the performance data for each of the plurality of agents, a caller-agent combination for each of the plurality of agents and each caller associated with the one or more client devices to generate a plurality of scores. The method may further include determining, based on the plurality of scores, the caller-agent combination with a highest score of the plurality of scores, assigning a first agent of the caller-agent combination with the highest score to the voice call session for a caller of the plurality of caller, and when the first agent is concurrently assigned to another voice call session for another caller of the plurality of callers, executing one or more iterations of the optimization algorithm of the machine learning model until (i) the first agent is assigned to one of the voice call session for the caller and the another voice call session for the another caller and (ii) a second agent of another caller-agent combination is assigned to the other of the voice call session for the caller and the another voice call session for the another caller.

Although the concepts of the present disclosure are described herein with primary reference to an intelligent caller to agent assignment, it is contemplated that the concepts will enjoy applicability to any setting for purposes of intelligent routing solutions, such as a business setting or otherwise, including and not limited to a customer service request, such as through voice, digital, online, or other like transmission technologies.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In embodiments described herein, systems and methods for intelligent caller to agent assignments for call center solutions provide a plurality of scores based on caller-agent combinations and operate to assign a first agent of a caller-agent combination with a highest score to a voice call session after execution of iterations of an optimization model to avoid a conflicting assignment for the first agent. Embodiments of the present disclosure are thus directed to an intelligent caller to agent assignment system and methods that includes an optimization algorithm implemented by a machine learning model to assign a caller to the first agent of a plurality of agents in real-time based on score, availability, and avoidance of conflicting assignments, which is described in greater detail further below.

Figure 1:
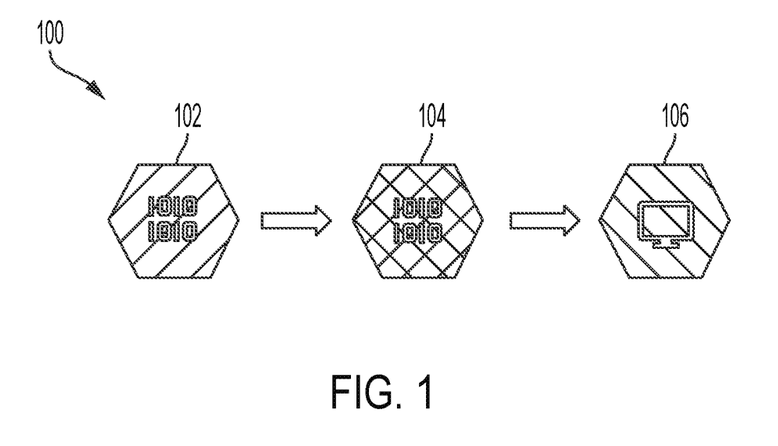
FIG. 1 illustrates a first stage of an intelligent caller to agent assignment solution utilizing models and an optimization algorithm, according to one or more embodiments shown and described herein.

Referring to FIG. 1, a first stage of an intelligent caller to agent solution 100 is shown including a caller model 102, an agent influence model 104, and an optimization algorithm 106 (implemented by a machine learning model 616 of FIG. 6, as described in greater detail below). The caller model 102 may include demographic information corresponding to each caller 202 (FIG. 2) that may include one or more factors of a caller profile for each caller stored in a caller profile directory. The intelligent caller to agent solution 100 may use the caller model 102 to classify an incoming call associated with a request to establish a voice call session from the caller 202 based on the caller profile associated with the caller 202. The caller profile may be retrieved from the caller profile directory associated with the caller model. The caller profile directory may include a plurality of caller profiles. The agent influence model 104 may determine performance data for each agent 204 (FIG. 2) of a plurality of agents 204. The performance data may include a likelihood of each agent associated with the agent influence model 104 of completing a sale with respect to one or more of the plurality of caller profiles. Based on the demographic information corresponding to each caller (e.g., of the caller model 102) and the performance data for each of the plurality of agents 204 (e.g., of the agent influence model 104), the optimization algorithm 106 may be used to score a caller-agent combination for each of the plurality of agents 204 and each caller 202, where each caller 202 may be associated with one or more client devices, to generate a plurality of scores. In some embodiments, the optimization algorithm 106 may generate a score matrix 200 of the plurality of scores, as shown in FIG. 2.

Figure 2:
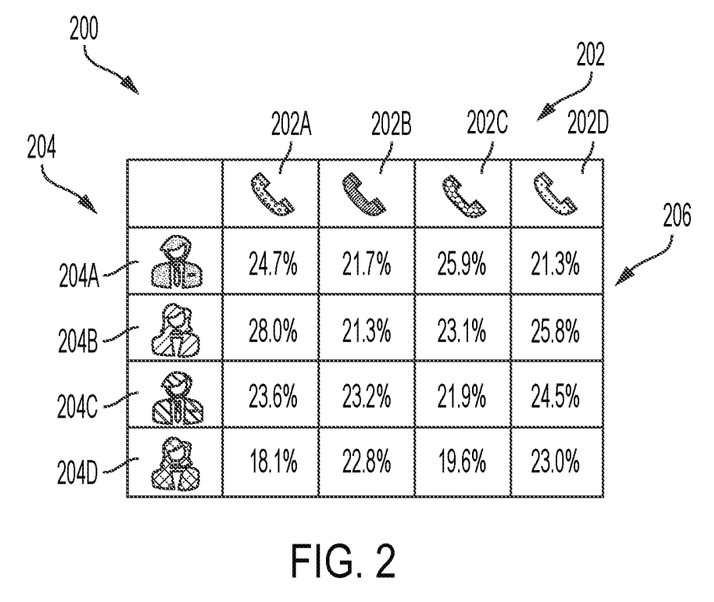
FIG. 2 illustrates a second stage of the intelligent caller to agent assignment solution of FIG. 1 including scores for a plurality of caller-agent combinations, according to one or more embodiments shown and described herein.

Referring now to FIG. 2, reflecting a second stage of the intelligent caller to agent solution 100, the generated score matrix 200 may include a plurality of scores 206 for each caller-agent combination based on (i) the demographic information corresponding to each caller 202 (individually shown as callers 202A, 202B, 202C, and 202D) associated with one or more client devices and (ii) the performance data for each of the plurality of agents 204 (individually shown as agents 204A, 204B, 204C, and 204D). It should be understood and is contemplated by this disclosure that any number of the plurality of callers 202 and the plurality of agents 204 may be represented, scored, and/or matched. The plurality of scores 206 reflected may be a percentage in a range from about 0% to about 100%.

In the score matrix 200 of FIG. 2, a plurality of scores 206 are generated and shown for a plurality of caller-agent combinations. For agent 204A, a score of 24.7% is associated with caller 202A, a score of 21.7% is associated with caller 202B, a score of 25.9% is associated with caller 202C, and a score of 21.3% is associated with caller 202D. For agent 204B, a score of 28.0% is associated with caller 202A, a score of 21.3% is associated with caller 202B, a score of 23.1% is associated with caller 202C, and a score of 25.8% is associated with caller 202D. For agent 204C, a score of 23.6% is associated with caller 202A, a score of 23.2% is associated with caller 202B, a score of 21.9% is associated with caller 202C, and a score of 24.5% is associated with caller 202D. For agent 204D, a score of 18.1% is associated with caller 202A, a score of 22.8% is associated with caller 202B, a score of 19.6% is associated with caller 202C, and a score of 23.0% is associated with caller 202D.

Thus, for caller 202A, a highest score of 28.0% is associated with caller-agent combination 202A, 204B. For caller 202B, a highest score of 23.2% is associated with caller-agent combination 202B, 204C. For caller 202C, a highest score of 25.9% is associated with caller-agent combination 202C, 204A. For caller 202D, a highest score of 25.8% is associated with caller-agent combination 202D, 204B.

Figure 3:
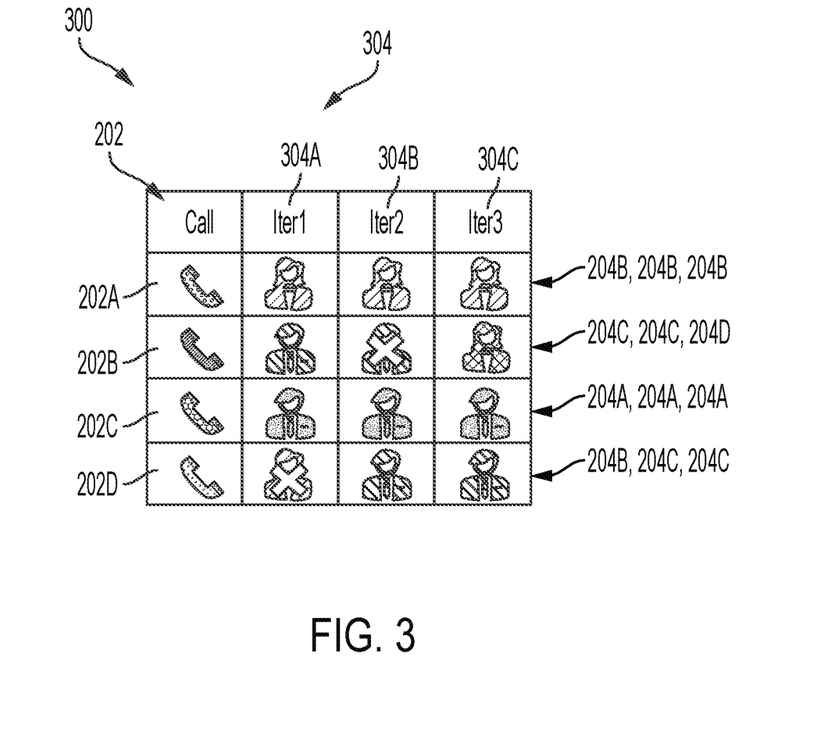
FIG. 3 illustrates a third stage of the intelligent caller to agent assignment solution of FIG. 1 including an execution of three iterations of the optimization algorithm, according to one or more embodiments shown and described herein.

In FIG. 3, as reflected in an iteration matrix 300, one or more iterations 304 of the optimization algorithm 106 are executed. The optimization algorithm 300 may be executed in real-time when each caller of the plurality of callers 202 establishes a connection with the intelligent caller to agent solution 100. In other embodiments, the algorithm 300 may be executed prior to connection with the plurality of callers 202. In a first iteration 304A, based off the based on the highest scores set forth in FIG. 2 for each caller 202, the following caller-agent combinations are paired: caller-agent combination 202A, 204B, caller-agent combination 202B, 204C, caller-agent combination 202C, 204A, and caller-agent combination 202D, 204B. Thus, agent 204B has a conflict in being assigned to both caller 202A and caller 202D in the first iteration 304A.

In a second iteration 304B, the following caller-agent combinations are paired: caller-agent combination 202A, 204B, caller-agent combination 202B, 204C, caller-agent combination 202C, 204A, and caller-agent combination 202D, 204C. While agent 204B is now only assigned to caller 202A, agent 204C has a conflict in being assigned to both caller 202B and caller 202D in the second iteration 304B.

In a third iteration 304C, the following caller-agent combinations are paired: caller-agent combination 202A, 204B, caller-agent combination 202B, 204D, caller-agent combination 202C, 204A, and caller-agent combination 202D, 204C, such that each agent 204 is now assigned to a single caller 202 without concurrently being assigning in conflict to another caller 202.

The optimization algorithm 106 determines, based on the plurality of scores 206, the caller-agent combination with a highest score. The optimization algorithm 106 may also assign a first agent 204 of the caller-agent combination with the highest score to the voice call session for a caller 202 of the plurality of callers 202. In some embodiments, the first agent 204, a second agent 204, a third agent 204, and a fourth agent 204 may be assigned to separate single voice call sessions. In other embodiments, one of the plurality of agents 204 may be concurrently assigned to another voice call session for another caller of the plurality of callers 202 (as represented in FIG. 3).

The demographic information corresponding to each caller may include one or more factors of a caller profile for each caller 202 stored in a caller profile directory. The caller profile may include a caller phone number stored in the caller profile directory. Moreover, the one or more factors of the caller profile may include caller location, a product associated with a caller inquiry, a call origination associated with a respective caller, a status of the respective caller as an existing customer or a new customer, a marital status of the respective caller, or combinations thereof.

Caller location may be a location in which the client device is located. In other embodiments, the caller location may be a location of the caller stored in the caller profile associated with the caller phone number. The product associated with the caller inquiry may include home insurance, vehicle insurance, life insurance, or any other suitable product. The product associated with a caller inquiry may be determined through an interactive voice response system that may ask the caller what product the caller is interested in and confirm the product the caller is interested in. The interactive voice response system may confirm the product that the caller is interested in by way of voice recognition or through the caller entering a number on the client device corresponding to a particular product.

The call origination may be determined by a vendor phone number that the respective caller called. For example, a first vendor phone number may be from an online advertising campaign, while a second vendor phone number may be from a billboard advertisement. Based on whether the respective caller called the first vendor phone number or the second vendor phone number, the call origination may be determined. The status of the respective caller as an existing customer or a new customer may be based on whether the respective call has purchased a product from the vendor the respective customer has called. The marital status of the respective caller may be determined as single, married, divorced, or any other suitable marital status. The marital status may have been previously provided by the caller; in other embodiments, the marital status may have been obtained through public records.

The performance data for each of the plurality of agents 204 of the agent influence model 104 may be indicative of sales performance of each of the plurality of agents 204 based on historical data associated with previous voice call sessions between each agent and one or more callers. For example, the performance data may be indicative of whether each agent 204 is licensed to conduct business in a region. The region may be a continent, country, state, territory, or any other suitable region. The performance data may also be indicative of whether the agent 204 speaks a particular foreign language. For example, some of the plurality of callers 202 may prefer a foreign-language speaking agent. The performance data may reflect which of the agents 204 speak the particular foreign language. In other embodiments, the performance data for each of the plurality of agents 204 may also be indicative of a likelihood of success of completing a sale associated with each of the plurality of agents 204 based on the demographic information corresponding to each caller 202, where each caller 202 of at least one caller may include the caller profile stored in the caller profile directory.

For example, each agent 204 may be more likely to complete a sale if the caller location is in a particular region. An agent located in New York may have a higher likelihood of success of completing a sale associated with a caller location in a northeast region of the United States; an agent located in South Carolina may have a higher likelihood of success of completing a sale associated with a caller location in a southeast region of the United States. In other embodiments, an agent specializing in car insurance may have a higher likelihood of success of completing a sale associated with the product associated with the caller inquiry being car insurance than an agent specializing in home insurance.

In some embodiments, the one or more callers includes at least one caller from the plurality of callers 202 stored in the caller profile directory. In other embodiments, only a portion of or none of the one or more callers includes at least one of the plurality of callers 202 stored in the caller profile directory. In such a case, the demographic information corresponding to the one or more caller may be recognized in real time by an area code of the caller phone number of the one or more caller or other publicly available information about the one or more caller.

In some embodiments, the caller model 102 may classify an incoming call associated with a request to establish the voice call session from the caller based on the caller profile associated with the caller, the caller profile from the caller profile directory associated with the caller model 102; the caller profile directory may include a plurality of caller profiles. Moreover, the agent influence model 104 may determine the performance data for each of the plurality of agents 204. In some embodiments, the performance data may include a likelihood of each agent associated with the agent influence model 104 of completing a sale with respect to one or more of the plurality of caller profiles.

Referring again to FIG. 3, and as described above, one or more iterations 304 of the optimization algorithm 106 may be run when the first agent 204B is concurrently assigned to another voice call session for another caller of the plurality of callers 202. The one or more iterations 304 are executed until (i) the first agent 204B is assigned to one of the voice call session for the caller and the another voice call session for the another caller and (ii) the second agent 204C of another caller-agent combination is assigned to the other of the voice call session for the caller and the another voice call session for the another caller.

In some embodiments, at least two, three, four, or more iterations 304 may be executed. For example, in FIG. 3, three iterations may be run before the optimization algorithm has matched all of the plurality of callers 202 with the plurality of agents 204 without any conflicting assignments. In the first iteration 304A, agent 204B is shown as assigned to a first caller 202A and a fourth caller 202D. In the second iteration 304B, agent 204A is shown as assigned to a second caller 202B and the fourth caller 202D. In the third iteration 304C, each of the plurality of callers 202 as shown as respectively matched with the plurality of agents 204, such that none of the plurality of agents 204 is concurrently assigned to another voice call session for another caller 202 of the plurality of callers 202.

While FIG. 3 illustrates a 1-to-1 solution as the iteration matrix 300, other solutions are contemplated and may be utilized. For example, a 1-to-many solution may be utilized, such that each of the plurality of agents 204 are assigned to no more than one of the plurality of callers 202. A many-to-many solution may additionally or alternatively be utilized, such that each of the plurality of agents 204 is assigned to multiple callers of the plurality of callers 202 and ranked based on priority. In embodiments, if an agent 204 is unavailable of n listed number of agents 204, the intelligent caller to agent solution 100 described herein may be discontinued and a default caller routing solution employed. In embodiments herein, a queue of the plurality of callers 202 may be matched to an agent 204 when available or a queue of agents 204 may be matched to a caller when the caller connects via an incoming call.

Figure 4:
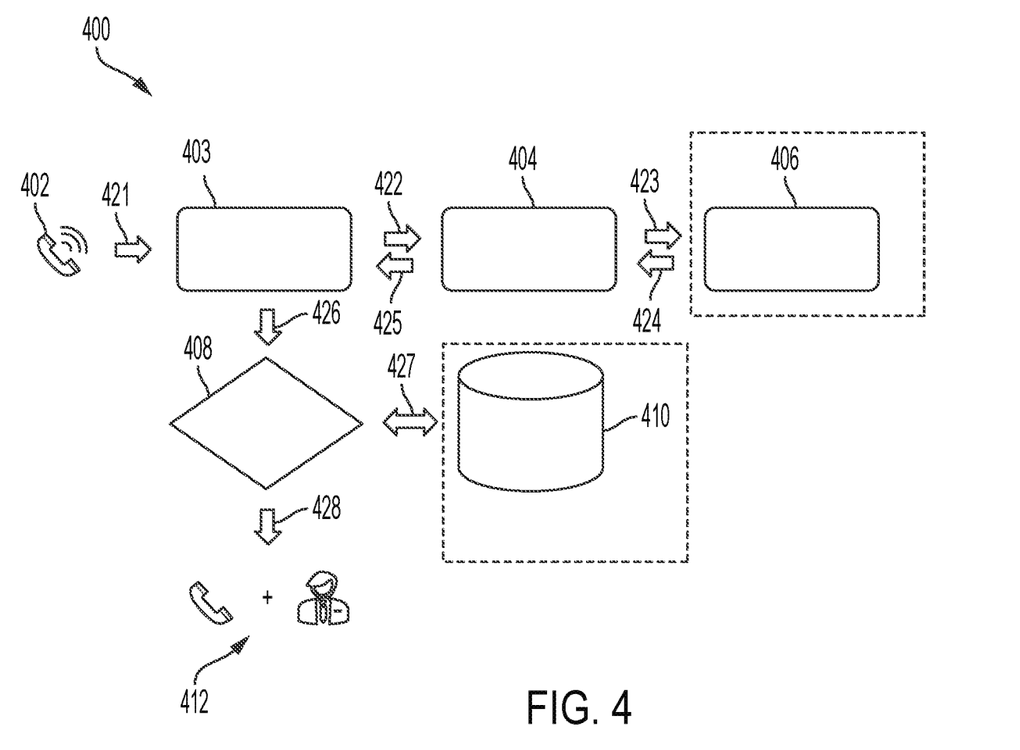
FIG. 4 illustrates a real-time routing system flow for use with the intelligent caller to agent solution of FIGS. 1-3, according to one or more embodiments shown and described herein.

Referring now to FIG. 4, an embodiment of a real-time routing system flow 400 is shown for use with the intelligent caller to agent solution 100 of FIGS. 1-3. The real-time routing system 400 includes an incoming call 402, an interactive voice response (IVR) module 403, a caller data module 404, a caller profile module 406, an agent profile module 408, a prioritization module 410, and a caller-agent combination for routing 412. The incoming call 402 is sent to the IVR module 403 via routing 421. The IVR module 403 may be configured to interact with a caller 202 of the incoming call 402 via presented a series of automated menus for caller selection, for example. The IVR module 403 may be configured to use the incoming call 402 to collect related base call data such as a phone number associated with the incoming call 402, a state of original of the incoming call 402, lead source data for the incoming call 402, and other similar data associated with the incoming call 402. The IVR module 403 may be configured to interact with the caller of the incoming call 402 to encourage the caller to answer prompts, to gather information from new lookups associated with the incoming call 402 and/or to open quotes associated with the incoming call 402, to add associated information such as a product type associated with the incoming call, and/or to determine a type of call of the incoming call 402 (e.g., whether the call is a sales call where the caller is inquiring about a product or service).

Next, the incoming call 402 is sent from the IVR module 403 to caller data module 404 via routing 422. In an embodiment, the IVR module 403 may further be configured to call the caller data module 404 as a web service and send information associated with the incoming call 402 to the web service of the caller data module 404, such as zip code, state, call type, automatic number identification (ANI), caller id, toll free number (TFN), dialed number identification service (DNIS), prior quote id, or like call information. The customer data module 404 may be configured to add caller data associated with the incoming call 402 such as demographics data and/or caller historical activity data.

The incoming call 402 is sent from the caller data module 404 to the caller profile module 406 via routing 423. The customer data module 404 (UCV) may be configured to send IVR data and individual caller data from the IVR module 403 along with included new variables such as demographics data and/or caller historical activity data to the caller profile module 406. The caller profile module 406 may be configured to run a model to classify and predict the caller associated with the incoming call 402 and determine an appropriate associated caller profile of the predicted caller associated with the incoming call 402. The caller profile module 406 may be further configured to assign a test and/or control flag to call in scenarios in which testing of the routing as described herein is occurring and/or to aid in future testing. The caller profile module 406 may be configured to run predictive models to generate a lead bind (e.g., a likelihood of success of an agent to complete a sale) and determine an agent with a highest lead bind to pair with the incoming call 402. The incoming call 402 is then sent from the caller profile module 406 back to the caller data module 404 via routing 424 and then to IVR module 403 via routing 425. Via routing 424, the caller profile module 406 may call and send information to the web service of the caller data module 404 such as a score rating, score, and/or an agent identification number for one or more agents 204. Via routing 425, the caller data module 404 may pass all values from the caller profile module 406 back to the IVR module 403 including, for example, the agent identification number (s) and values such as experiment values for testing. The IVR module 403 may be configured to play disclaimers and/or other messaging to the caller of the incoming call 402 during this time period and may log the received agent identification number(s) and other received values.

The incoming call 402 is then sent from the IVR module 403 to the agent profile module 408 via routing 426. The agent profile module 408 may perform an agent skill lookup and/or availability check. The agent skill lookup may be based on call type, state of origination of call, a score rating, or other received values associated with the incoming call 402. The incoming call 402 is sent from the agent profile module 408 to and back from the prioritization module 410 via routing 427. The prioritization module 410 may be configured to prioritize agents 204 based on caller profiles of callers 202, which prioritization may be predetermined at a time period using historical performance data of the agents 204. The time period may be, for example, in real-time, daily, weekly, monthly, or bi-annually. The prioritization module 410 may be configured to be used by the optimization algorithm 106 to set a prioritization table, which may be updated in the time period. In embodiments, updates to one or more rules and a logic layer for assigning incoming calls may be updated in the time period. In real-time, the incoming-call may be routed to a highest priority agent in a priority list of the caller 202 based on the caller's profile based on the available prioritization table. A sub-routine may be activated to execute alternative routing when all prioritized agents 204 are unavailable or when an intended match fails because a prioritized agent 204 becomes unavailable before a routing could be completed. The incoming call 402 is then sent via routing 428 from the agent profile module 408 to a processor 604 (FIG. 6) executing the optimization algorithm 106 to determine the caller-agent combination for routing 412 and match the caller 202 to an agent 204 per the optimization algorithm 106 and as described herein.

Figure 5:
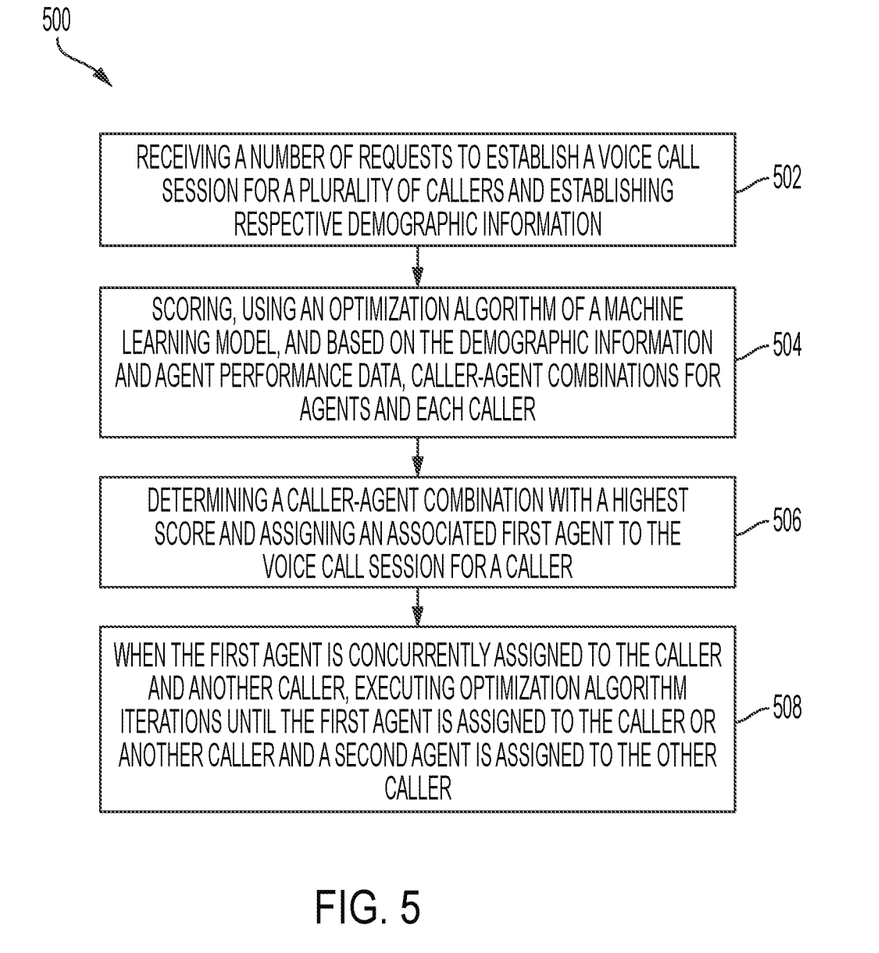
FIG. 5 illustrates a flowchart of a process for use with the intelligent caller to agent solution of FIGS. 1-3 and flow of FIG. 4, according to one or more embodiments shown and described herein.

Referring to FIG. 5, an embodiment of a process 500 is shown for use of the intelligent caller to agent solution 100 of FIGS. 1-3 and/or real-time routing system flow 400 of FIG. 4 (as may be implemented by a intelligent caller to agent system 600 of FIG. 6, which is described in greater detail further below). In block 502, the process 500 may include receiving a number of requests to establish a voice call session for the plurality of callers 202 from the one or more client devices. The number of requests may be an event that is a call or an electronic communication such as an e-mail or chat message. For instance, the number of requests may be a video call and/or an audio call from the caller phone number associated with the caller 202 in the caller profile directory. The electronic communication may be at least one of an email or an electronic contact, such as a chat, text, or video call, from the one or more client devices.

The process 500 may also include identifying the demographic information corresponding to each caller 202 associated with the one or more client devices. In block 504, using the optimization algorithm 106 of the machine learning model 616 and based on the demographic information corresponding to each caller 202 and the performance data for each of the plurality of agents 204, the caller-agent combination for each of the plurality of agents 204 and each caller 202 associated with the one or more client devices may be scored to generate the plurality of scores 206, such as in the embodiment shown in FIG. 2.

In block 506, based on the plurality of scores 206, the caller-agent combination with the highest score of the plurality of scores 206 is determined. A first agent 204 of the caller-agent combination with the highest score is assigned to the voice call session for a caller 202 of the plurality of callers 202.

In Block 506, when the first agent 204 is concurrently assigned to another voice call session for another caller 202 of the plurality of callers 202, the one or more iterations 304 of the optimization algorithm 106 of the machine learning model 616 are executed by the processor 606 (FIG. 6) until (i) the first agent 204 is assigned to one of the voice call session for the caller and the another voice call session for the another caller and (ii) a second agent 204 of another caller-agent combination is assigned to the other of the voice call session for the caller 202 and the another voice call session for the another caller 202.

The process 500 may also include determining an expected call volume and adjusting the plurality of scores 206 based on the expected call volume. For example, the expected call volume may be at a peak from 12:00 p.m. to 2:00 p.m. eastern standard time. The plurality of scores 206 may be adjusted if it is between 12:00 PM and 2:00 PM, such as to efficiently establish the voice call sessions between the plurality of callers 202 and the plurality of agents 204. In other embodiments, the method 500 may include adjusting the plurality of scores 206 based on an expected agent availability. When an agent is expected to be unavailable in five minutes, for example, the score for that agent 204 may be decreased so that the agent 204 does not have to transfer the voice call session to another agent 204 or end the voice call session earlier than what the caller 202 prefers.

The process 500 may further include accessing the performance data for each of the plurality of agents 204. The performance data may be indicative of sales performance of each of the plurality of agents 204 based on historical data associated with previous voice call sessions between each agent 204 and one or more callers. The performance data may be updated monthly, weekly, daily, or in real-time. The machine learning model 616 (FIG. 6), as described in greater detail below with respect to FIG. 6, may be trained based on the performance data.

Figure 6:
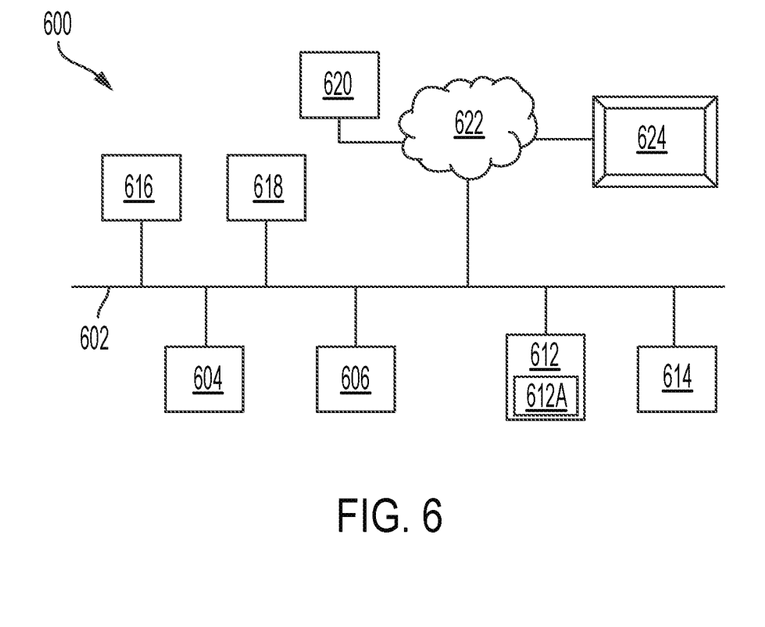
FIG. 6 illustrates a computer implemented system for use with the process of FIG. 5, the flow of FIG. 4, and the intelligent caller to agent solution of FIGS. 1-3, according to one or more embodiments shown and described herein.

FIG. 6 illustrates the computer implemented intelligent caller to agent system 600 for use with the process 500 of FIG. 5, real-time routing system flow 400 of FIG. 4, and/or intelligent caller to agent solution of FIGS. 1-3. Referring to FIG. 6, the intelligent caller to agent system 600 is configured for implementing a computer and software-based method, such as directed by the intelligent caller to agent solution 100, real-time routing system flow 400, and/or the process 500, to route the number of requests to establish the voice call session for the plurality of callers 202, as described herein. The intelligent caller to agent system 600 comprises a communication path 602, at least one processor 604, a non-transitory memory component 606, an optimization module 612, a data contextualization sub-module 612A of the optimization module 612, a storage or database 614, a machine learning model 616, a network interface hardware 618, a network 622, a server 620, and a computing device 624. The various components of the intelligent caller to agent system 600 and the interaction thereof will be described in detail below.

While only one server 620 and one computing device 624 is illustrated, the intelligent caller to agent system 600 can include multiple servers containing one or more applications and computing devices. In some embodiments, the intelligent caller to agent system 600 is implemented using a wide area network (WAN) or network 622, such as an intranet or the internet. The computing device 624 may include digital systems and other devices permitting connection to and navigation of the network. It is contemplated and within the scope of this disclosure that the computing device 624 may be a personal computer, a laptop device, a smart mobile device such as a smart phone or smart pad, or the like. Other intelligent caller to agent system 600 variations allowing for communication between various geographically diverse components are possible. The lines depicted in FIG. 6 indicate communication rather than physical connections between the various components.

The intelligent caller to agent system 600 comprises the communication path 602. The communication path 602 may be formed from any medium that is capable of transmitting a signal such as, for example, conductive wires, conductive traces, optical waveguides, or the like, or from a combination of mediums capable of transmitting signals. The communication path 602 communicatively couples the various components of the intelligent caller to agent system 600. As used herein, the term "communicatively coupled" means that coupled components are capable of exchanging data signals with one another such as, for example, electrical signals via conductive medium, electromagnetic signals via air, optical signals via optical waveguides, and the like.

The intelligent caller to agent system 600 of FIG. 6 comprises the processor 604. The processor 604 can be any device capable of executing machine readable instructions. Accordingly, the processor 604 may be a controller, an integrated circuit, a microchip, a computer, or any other computing device. The processor 604 is communicatively coupled to the other components of the intelligent caller to agent system 600 by the communication path 602. Accordingly, the communication path 602 may communicatively couple any number of processors with one another, and allow the modules coupled to the communication path 602 to operate in a distributed computing environment. Specifically, each of the modules can operate as a node that may send and/or receive data.

The illustrated caller to agent system 600 further comprises the memory component 606, which is communicatively coupled to the communication path 602 and communicatively coupled to the processor 604. The memory component 606 may be a non-transitory computer readable medium or non-transitory computer readable memory and may be configured as a nonvolatile computer readable medium. The memory component 606 may comprise RAM, ROM, flash memories, hard drives, or any device capable of storing machine readable instructions such that the machine readable instructions can be accessed and executed by the processor 604. The machine readable instructions may comprise logic or algorithm(s) written in any programming language such as, for example, machine language that may be directly executed by the processor 604, or assembly language, object-oriented programming (OOP), scripting languages, microcode, etc., that may be compiled or assembled into machine readable instructions and stored on the memory component 606. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. When the machine-readable instructions are executed by the processor 604, the machine-readable instructions may cause the intelligent caller to agent system 600 to execute the at least one iteration 304 of the optimization algorithm 106 of the machine learning model 616.

Still referring to FIG. 6, as noted above, the intelligent caller to agent system 600 comprises the display such as a graphical user interface (GUI) on a screen of the computing device 624 for providing visual output such as, for example, information, graphical reports, messages, or a combination thereof. The display on the screen of the computing device 624 is coupled to the communication path 602 and communicatively coupled to the processor 604. Accordingly, the communication path 602 communicatively couples the display to other modules of the intelligent caller to agent system 600. The display can comprise any medium capable of transmitting an optical output such as, for example, a cathode ray tube, light emitting diodes, a liquid crystal display, a plasma display, or the like. Additionally, it is noted that the display or the computing device 624 can comprise at least one of the processor 604 and the memory component 606. While the intelligent caller to agent system 600 is illustrated as a single, integrated system in FIG. 6, in other embodiments, the systems can be independent systems.

The intelligent caller to agent system 600 comprises the optimization module 612 as described above to use the optimization algorithm 106 and machine learning model 616 to at least generate the plurality of scores 206 based on the demographic information for each of the plurality of callers 202 and the performance data for each of the plurality of agents 204, and to use the data contextualization sub-module 612A to provide contextual data for the demographic information, such as through the caller profile including an associated caller profile in the caller profile directory. The machine learning model 616 may further be used for generating a confidence level threshold that is machine learned and adjustable for a respectively associated score of the plurality of scores 206. The machine learning model 616 may include an artificial intelligence component to train and provide machine learning capabilities to a neural network as described herein. Certain plurality of scores may have to exceed predetermined or machine learned adjustable confidence level thresholds prior to assigning the first agent 204A of the caller-agent combination with the highest score to the voice call session for a caller 202 of the plurality of callers 202.

The optimization module 612, the data contextualization sub-module 612A, and the machine learning model 616 are communicatively coupled to the communication path 602 and communicatively coupled to the processor 604. As will be described in further detail below, the processor 604 may process the input signals received from the system modules and/or extract information from such signals. Other modules such as those described with respect to the real-time routing system flow 400 of FIG. 4 may be communicatively coupled to and/or disposed within the optimization module 612 for execution of the optimization algorithm 106 of the machine learning model 616.

Data stored and manipulated in the intelligent caller to agent system 600 as described herein is utilized by the machine learning model 616, which is able to leverage a cloud computing-based network configuration such as the cloud to apply Machine Learning and Artificial Intelligence. This machine learning application may create models that can be applied by the intelligent caller to agent system 600, to make it more efficient and intelligent in execution. As an example and not a limitation, the machine learning model 616 may include artificial intelligence components selected from the group consisting of an artificial intelligence engine, Bayesian inference engine, and a decision-making engine, and may have an adaptive learning engine further comprising a deep neural network learning engine.

The intelligent caller to agent system 600 comprises the network interface hardware 618 for communicatively coupling the intelligent caller to agent system 600 with a computer network such as network 622. The network interface hardware 618 is coupled to the communication path 602 such that the communication path 602 communicatively couples the network interface hardware 618 to other modules of the intelligent caller to agent system 600. The network interface hardware 618 can be any device capable of transmitting and/or receiving data via a wireless network. Accordingly, the network interface hardware 618 can comprise a communication transceiver for sending and/or receiving data according to any wireless communication standard. For example, the network interface hardware 618 can comprise a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 6, data from various applications running on computing device 624 can be provided from the computing device 624 to the intelligent caller to agent system 600 via the network interface hardware 618. The computing device 624 can be any device having hardware (e.g., chipsets, processors, memory, etc.) for communicatively coupling with the network interface hardware 618 and a network 622. Specifically, the computing device 624 can comprise an input device having an antenna for communicating over one or more of the wireless computer networks described above.

The network 622 can comprise any wired and/or wireless network such as, for example, wide area networks, metropolitan area networks, the internet, an intranet, satellite networks, or the like. Accordingly, the network 622 can be utilized as a wireless access point by the computing device 624 to access one or more servers (e.g., a server 620). The server 620 and any additional servers generally comprise processors, memory, and chipset for delivering resources via the network 622. Resources can include providing, for example, processing, storage, software, and information from the server 620 to the intelligent caller to agent system 600 via the network 622. Additionally, it is noted that the server 620 and any additional servers can share resources with one another over the network 622 such as, for example, via the wired portion of the network, the wireless portion of the network, or combinations thereof.

In embodiments, the intelligent caller to agent systems and methods as described herein assist to significantly reduce the inefficiencies associated with assigning callers 202 to agents 204 of a call center and to accurately assign specific callers 202 to agents 204 that have a particular skill or qualification through one or more iterations 304 of an optimization algorithm 106 as described herein. As a non-limiting example, such callers 202 may be assigned to agents 204 based on demographic information of the callers 202 and performance data of the agents 204 in a first iteration 304A. When an agent 204 is concurrently assigned to more than one voice call session, further iterations 304 are executed until the agents 204 are not concurrently assigned to more than one caller 202 and the callers 202 are each assigned to an agent 304. Moreover, a machine learning model 616 may be utilized to facilitate efficient and effective call assignment with a faster processing system through such increased efficiencies of intelligent caller to agent assignment as described herein.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use.

It is noted that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Aspects Listing:

Aspect 1. A computer implemented system for intelligent caller to agent assignment, the system including: at least one processor, a memory unit communicatively coupled to the at least one processor, wherein the memory unit stores computer-readable instructions that, when executed by the at least one processor, cause the computer implemented system to: receive, from one or more client devices, a number of requests to establish a voice call session for a plurality of callers, identify demographic information corresponding to each caller associated with the one or more client devices, score, using an optimization algorithm of a machine learning model and based on the demographic information corresponding to each caller and performance data for each of a plurality of agents, a caller-agent combination for each of the plurality of agents and each caller associated with the one or more client devices to generate a plurality of scores, determine, based on the plurality of scores, the caller-agent combination with a highest score of the plurality of scores, and assign a first agent of the caller-agent combination with the highest score to the voice call session for a caller of the plurality of callers, and when the first agent is concurrently assigned to another voice call session for another caller of the plurality of callers, execute one or more iterations of the optimization algorithm of the machine learning model until (i) the first agent is assigned to one of the voice call session for the caller and the another voice call session for the another caller and (ii) a second agent of another caller-agent combination is assigned to the other of the voice call session for the caller and the another voice call session for the another caller.

Aspect 2. The computer implemented system of Aspect 1, wherein the memory unit stores additional computer-readable instructions that, when executed by the at least one processor, further cause the computer implemented system to: access the performance data for each of the plurality of agents, the performance data indicative of sales performance of each of the plurality of agents based on historical data associated with previous voice call sessions between each agent and one or more callers, and train the machine learning model based on the performance data.

Aspect 3. The computer implemented system of Aspect 1 or Aspect 2, wherein the performance data for each of the plurality of agents is indicative of whether each agent is licensed to conduct business in a region.

Aspect 4. The computer implemented system of any of Aspect 1 to Aspect 3, wherein the performance data for each of the plurality of agents is indicative of a likelihood of success of completing a sale associated with each of the plurality of agents based on the demographic information corresponding to each caller, each caller of at least one caller including a caller profile stored in a caller profile directory.

Aspect 5. The computer implemented system of Aspect 4, wherein the one or more callers include at least one caller of the plurality of callers.

Aspect 6. The computer implemented system of any of Aspect 1 to Aspect 5, wherein the demographic information corresponding to each caller includes one or more factors of a caller profile for each caller stored in a caller profile directory.

Aspect 7. The computer implemented system of Aspect 6, wherein the caller profile includes a caller phone number stored in the caller profile directory.

Aspect 8. The computer implemented system of any of Aspect 1 to Aspect 7, wherein the demographic information corresponding to each caller includes one or more factors, the one or more factors including a caller location, a product associated with a caller inquiry, a call origination associated with a respective caller, a status of the respective caller as an existing customer or a new customer, marital status of the respective caller, or combinations thereof.

Aspect 9. The computer implemented system of any of Aspect 1 to Aspect 8, wherein at least two or more iterations are executed.

Aspect 10. The computer implemented system of any of Aspect 1 to Aspect 9, wherein the memory unit stores additional computer-readable instructions that, when executed by the at least one processor, further cause the computer implemented system to: determine an expected call volume and adjust the plurality of scores based on the expected call volume.

Aspect 11. The computer implemented system of any of Aspect 1 to Aspect 10, wherein the memory unit stores additional computer-readable instructions that, when executed by the at least one processor, further cause the computer implemented system to: classify, via a caller model, an incoming call associated with a request to establish the voice call session from the caller based on a caller profile associated with the caller, the caller profile from a caller profile directory associated with the caller model, wherein the caller profile directory includes a plurality of caller profiles, and determine, via an agent influence model, the performance data for each of the plurality of agents, wherein the performance data includes a likelihood of each agent associated with the agent influence model of completing a sale with respective to one or more of the plurality of caller profiles.

Aspect 12. A method for intelligent caller to agent assignment, the method including: receiving, from one or more client devices, a number of requests to establish a voice call session for a plurality of callers, identifying demographic information corresponding to each caller associated with the one or more client devices, scoring, using an optimization algorithm of a machine learning model and based on the demographic information corresponding to each caller and performance data for each of a plurality of agents, a caller-agent combination for each of the plurality of agents and each caller associated with the one or more client devices to generate a plurality of scores, determining, based on the plurality of scores, the caller-agent combination with a highest score of the plurality of scores, assigning a first agent of the caller-agent combination with the highest score to the voice call session for a caller of the plurality of callers, and when the first agent is concurrently assigned to another voice call session for another caller of the plurality of callers, executing one or more iterations of the optimization algorithm of the machine learning model until (i) the first agent is assigned to one of the voice call session for the caller and the another voice call session for the another caller and (ii) a second agent of another caller-agent combination is assigned to the other of the voice call session for the caller and the another voice call session for the another caller.

Aspect 13. The method of Aspect 12, further including: accessing the performance data for each of the plurality of agents, the performance data indicative of sales performance of each of the plurality of agents based on historical data associated with previous voice call sessions between each agent and one or more callers and training the machine learning model based on the performance data.

Aspect 14. The method of Aspect 12 or Aspect 13, wherein the demographic information corresponding to each caller includes one or more factors of a caller profile for each caller stored in a caller profile directory.

Aspect 15. The method of Aspect 14, wherein the caller profile includes a caller phone number stored in the caller profile directory.

Aspect 16. The method of any of Aspect 12 to Aspect 15, wherein the demographic information corresponding to each caller includes one or more factors, the one or more factors including a caller location, a product associated with a caller inquiry, a call origination associated with a respective caller, a status of the respective caller as an existing customer or a new customer, marital status of the respective caller, or combinations thereof.

Aspect 17. The method of any of Aspect 12 to Aspect 16, wherein at least two or more iterations are executed.

Aspect 18. The method of any of Aspect 12 to Aspect 17, further including: determining an expected call volume and adjusting the plurality of scores based on the expected call volume.

Aspect 19. The method of any of Aspect 12 to Aspect 18, further including: classifying, via a caller model, an incoming call associated with a request to establish the voice call session from the caller based on a caller profile associated with the caller, the caller profile from a caller profile directory associated with the caller model, wherein the caller profile directory includes a plurality of caller profiles, and determining, via an agent influence model, the performance data for each of the plurality of agents, wherein the performance data includes a likelihood of each agent associated with the agent influence model of completing a sale with respective to one or more of the plurality of caller profiles.

Aspect 20. A method for intelligent caller to agent assignment, the method including: receiving, from one or more client devices, a number of requests to establish a voice call session for a plurality of callers, identifying demographic information corresponding to each caller associated with the one or more client devices, wherein the demographic information corresponding to each caller includes one or more factors of a caller profile for each caller stored in a caller profile directory, accessing performance data for each of a plurality of agents, training a machine learning model based on the performance data, scoring, using an optimization algorithm of the machine learning model and based on the demographic information corresponding to each caller and the performance data for each of the plurality of agents, a caller-agent combination for each of the plurality of agents and each caller associated with the one or more client devices to generate a plurality of scores, determining, based on the plurality of scores, the caller-agent combination with a highest score of the plurality of scores, assigning a first agent of the caller-agent combination with the highest score to the voice call session for a caller of the plurality of caller, and when the first agent is concurrently assigned to another voice call session for another caller of the plurality of callers, executing one or more iterations of the optimization algorithm of the machine learning model until (i) the first agent is assigned to one of the voice call session for the caller and the another voice call session for the another caller and (ii) a second agent of another caller-agent combination is assigned to the other of the voice call session for the caller and the another voice call session for the another caller.

What is claimed is:
1. A computer implemented system for intelligent caller to agent assignment, the system comprising:
at least one processor;
a memory unit communicatively coupled to the at least one processor, wherein the memory unit stores com- puter-readable instructions that, when executed by the at least one processor, cause the computer implemented system to:
  receive, from one or more client devices, a number of requests to establish a voice call session for a plurality of callers;
  identify demographic information corresponding to each caller associated with the one or more client devices;
  score, using an optimization algorithm of a machine learning model and based on the demographic information corresponding to each caller and performance data for each of a plurality of agents, a caller-agent combination for each of the plurality of agents and each caller associated with the one or more client devices to generate a plurality of scores;
  determine, based on the plurality of scores, the caller-agent combination with a highest score of the plurality of scores; and
  assign a first agent of the caller-agent combination with the highest score to the voice call session for a caller of the plurality of callers; and
  when the first agent is concurrently assigned to another voice call session for another caller of the plurality of callers, execute one or more iterations of the optimization algorithm of the machine learning model until (i) the first agent is assigned to one of the voice call session for the caller and the another voice call session for the another caller and (ii) a second agent of another caller-agent combination is assigned to the other of the voice call session for the caller and the another voice call session for the another caller.

2. The computer implemented system of claim 1, wherein the memory unit stores additional computer-readable instructions that, when executed by the at least one processor, further cause the computer implemented system to:
  access the performance data for each of the plurality of agents, the performance data indicative of sales performance of each of the plurality of agents based on historical data associated with previous voice call sessions between each agent and one or more callers; and
  train the machine learning model based on the performance data.

3. The computer implemented system of claim 1, wherein the performance data for each of the plurality of agents is indicative of whether each agent is licensed to conduct business in a region.

4. The computer implemented system of claim 1, wherein the performance data for each of the plurality of agents is indicative of a likelihood of success of completing a sale associated with each of the plurality of agents based on the demographic information corresponding to each caller, each caller of at least one caller comprising a caller profile stored in a caller profile directory.

5. The computer implemented system of claim 4, wherein one or more callers comprise at least one caller of the plurality of callers.

6. The computer implemented system of claim 1, wherein the demographic information corresponding to each caller comprises one or more factors of a caller profile for each caller stored in a caller profile directory.

7. The computer implemented system of claim 6, wherein the caller profile comprises a caller phone number stored in the caller profile directory.

8. The computer implemented system of claim 1, wherein the demographic information corresponding to each caller comprises one or more factors, the one or more factors comprising a caller location, a product associated with a caller inquiry, a call origination associated with a respective caller, a status of the respective caller as an existing customer or a new customer, marital status of the respective caller, or combinations thereof.

9. The computer implemented system of claim 1, wherein at least two or more iterations are executed.

10. The computer implemented system of claim 1, wherein the memory unit stores additional computer-readable instructions that, when executed by the at least one processor, further cause the computer implemented system to:
  determine an expected call volume; and
  adjust the plurality of scores based on the expected call volume.

11. The computer implemented system of claim 1, wherein the memory unit stores additional computer-readable instructions that, when executed by the at least one processor, further cause the computer implemented system to:
  classify, via a caller model, an incoming call associated with a request to establish the voice call session from the caller based on a caller profile associated with the caller, the caller profile from a caller profile directory associated with the caller model, wherein the caller profile directory comprises a plurality of caller profiles; and
  determine, via an agent influence model, the performance data for each of the plurality of agents, wherein the performance data comprises a likelihood of each agent associated with the agent influence model of completing a sale with respect to one or more of the plurality of caller profiles.

12. A method for intelligent caller to agent assignment, the method comprising:
  receiving, from one or more client devices, a number of requests to establish a voice call session for a plurality of callers;
  identifying demographic information corresponding to each caller associated with the one or more client devices;
  scoring, using an optimization algorithm of a machine learning model and based on the demographic information corresponding to each caller and performance data for each of a plurality of agents, a caller-agent combination for each of the plurality of agents and each caller associated with the one or more client devices to generate a plurality of scores;
  determining, based on the plurality of scores, the caller-agent combination with a highest score of the plurality of scores;
  assigning a first agent of the caller-agent combination with the highest score to the voice call session for a caller of the plurality of callers; and
  when the first agent is concurrently assigned to another voice call session for another caller of the plurality of callers, executing one or more iterations of the optimization algorithm of the machine learning model until (i) the first agent is assigned to one of the voice call session for the caller and the another voice call session for the another caller and (ii) a second agent of another caller-agent combination is assigned to the other of the voice call session for the caller and the another voice call session for the another caller.

13. The method of claim 12, further comprising:
  accessing the performance data for each of the plurality of agents, the performance data indicative of sales performance of each of the plurality of agents based on historical data associated with previous voice call sessions between each agent and one or more callers; and training the machine learning model based on the performance data.

14. The method of claim 12, wherein the demographic information corresponding to each caller comprises one or more factors of a caller profile for each caller stored in a caller profile directory.

15. The method of claim 14, wherein the caller profile comprises a caller phone number stored in the caller profile directory.

16. The method of claim 12, wherein the demographic information corresponding to each caller comprises one or more factors, the one or more factors comprising a caller location, a product associated with a caller inquiry, a call origination associated with a respective caller, a status of the respective caller as an existing customer or a new customer, marital status of the respective caller, or combinations thereof.

17. The method of claim 12, wherein at least two or more iterations are executed.

18. The method of claim 12, further comprising:
determining an expected call volume; and
adjusting the plurality of scores based on the expected call volume.

19. The method of claim 12, further comprising:
classifying, via a caller model, an incoming call associated with a request to establish the voice call session from the caller based on a caller profile associated with the caller, the caller profile from a caller profile directory associated with the caller model, wherein the caller profile directory comprises a plurality of caller profiles; and
determining, via an agent influence model, the performance data for each of the plurality of agents, wherein the performance data comprises a likelihood of each agent associated with the agent influence model of completing a sale with respect to one or more of the plurality of caller profiles.

20. A method for intelligent caller to agent assignment, the method comprising:
receiving, from one or more client devices, a number of requests to establish a voice call session for a plurality of callers;
identifying demographic information corresponding to each caller associated with the one or more client devices, wherein the demographic information corresponding to each caller comprises one or more factors of a caller profile for each caller stored in a caller profile directory;
accessing performance data for each of a plurality of agents;
training a machine learning model based on the performance data;
scoring, using an optimization algorithm of the machine learning model and based on the demographic information corresponding to each caller and the performance data for each of the plurality of agents, a caller-agent combination for each of the plurality of agents and each caller associated with the one or more client devices to generate a plurality of scores;
determining, based on the plurality of scores, the caller-agent combination with a highest score of the plurality of scores;
assigning a first agent of the caller-agent combination with the highest score to the voice call session for a caller of the plurality of callers; and
when the first agent is concurrently assigned to another voice call session for another caller of the plurality of callers, executing one or more iterations of the optimization algorithm of the machine learning model until (i) the first agent is assigned to one of the voice call session for the caller and the another voice call session for the another caller and (ii) a second agent of another caller-agent combination is assigned to the other of the voice call session for the caller and the another voice call session for the another caller.

* * * * *